(12) United States Patent
Alexander et al.

(10) Patent No.: US 7,073,619 B2
(45) Date of Patent: Jul. 11, 2006

(54) VEHICLE FRONTAL AIRBAG SYSTEM

(75) Inventors: Cherie Alexander, Glendale, AZ (US);
Steven Hailstone, Chandler, AZ (US);
Paul Curry, Phoenix, AZ (US)

(73) Assignee: Universal Propolusion Company, Phoenix, AZ (US)

( * ) Notice: Subject to any disclaimer, the term of this patent is extended or adjusted under 35 U.S.C. 154(b) by 74 days.

(21) Appl. No.: 10/496,594

(22) PCT Filed: Dec. 19, 2002

(86) PCT No.: PCT/US02/40688
§ 371 (c)(1),
(2), (4) Date: May 21, 2004

(87) PCT Pub. No.: WO03/053751
PCT Pub. Date: Jul. 3, 2003

(65) Prior Publication Data
US 2005/0230940 A1    Oct. 20, 2005

Related U.S. Application Data

(60) Provisional application No. 60/341,984, filed on Dec. 19, 2001.

(51) Int. Cl.
*B60R 21/34* (2006.01)
(52) U.S. Cl. .................... 180/274; 280/730.1
(58) Field of Classification Search ........... 180/274; 280/730.1, 743.2; 293/117, 107; 296/187.04; B60R 21/34
See application file for complete search history.

(56) References Cited

U.S. PATENT DOCUMENTS 3,708,194 A * 1/1973 Amit ................ 293/1

(Continued)

FOREIGN PATENT DOCUMENTS

| DE | 19918202 A1 | * | 10/2000 |
| EP | 1024063 A2 | * | 8/2000 |
| GB | 2345669 A | * | 7/2000 |
| JP | 2001322518 A | * | 11/2001 |

OTHER PUBLICATIONS

"Vehicle leading bumper airbag for pedestrian protection comprises front and back panels joined by internal tethers and extending side wings to wrap around the vehicle sides on deployment aided by tethers", May 10, 2000, Research Disclosure RD433005A.*

*Primary Examiner*—David R. Dunn
(74) *Attorney, Agent, or Firm*—Jerry Holden; John D. Titus

(57) ABSTRACT

The present invention comprises an external airbag system for mounting on a vehicle (24) that deploys into the region above the bumper (38) to prevent or mitigate injuries that would have otherwise been caused by a person striking the grill (28) or hood area (26) of the vehicle. The airbag (20) is stored in a housing (40) mounted within the front bumper (38) of the vehicle. The airbag (20) is deployed upwardly through an opening (42) in the upper surface of the bumper (38) into the region between the upper surface of the bumper (38) and the front surface of the grill (28) and hood (26). The airbag (20) is generally T-shaped and includes a plurality of internal tethers (30,31) extending internally between the opposing inner surfaces (74) at regular intervals to cause the airbag (20) to be tufted. The internal tethers (30, 31) reduce the volume of the airbag (20) for a given frontal area thereby decreasing the inflation time required, without resort to fabricating the airbag (20) from multiple independent chambers. Selected of the internal tethers (31) may be designed to break as the airbag reaches close to its full inflation pressure to allow a portion of the airbag to bulge outwardly after the air bag is fully deployed. The remaining tethers (30) are designed to break as the pressure increases when the airbag is collapsed in a collision.

12 Claims, 7 Drawing Sheets

U.S. PATENT DOCUMENTS

| | | |
|---|---|---|
| 5,646,613 A | 7/1997 | Cho |
| 5,725,265 A * | 3/1998 | Baber .................. 293/107 |
| 5,732,785 A | 3/1998 | Ran et al. |
| 6,056,336 A | 5/2000 | Balgobin |
| 6,126,214 A | 10/2000 | Kim |
| 6,450,556 B1 | 9/2002 | Jacobs |
| 6,474,679 B1 | 11/2002 | Miyasaka et al. |
| 6,637,788 B1 * | 10/2003 | Zollner et al. .............. 293/107 |

* cited by examiner

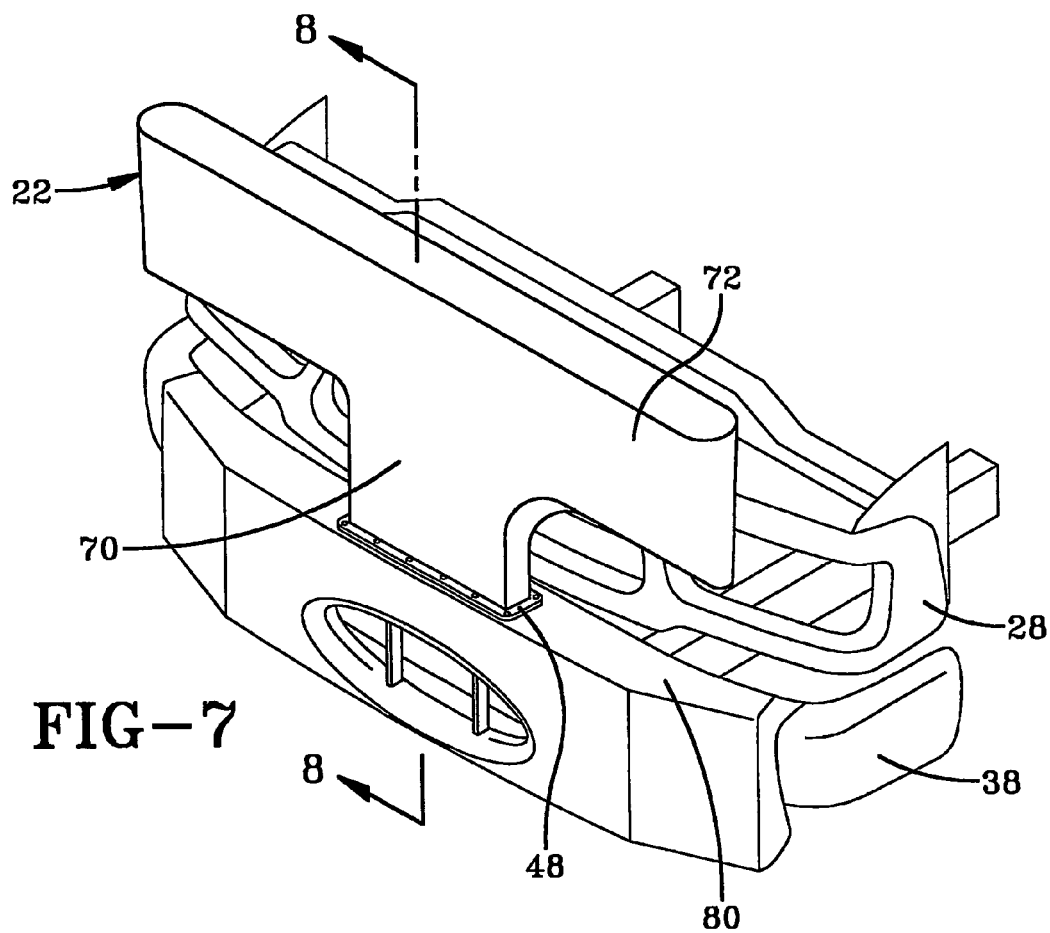
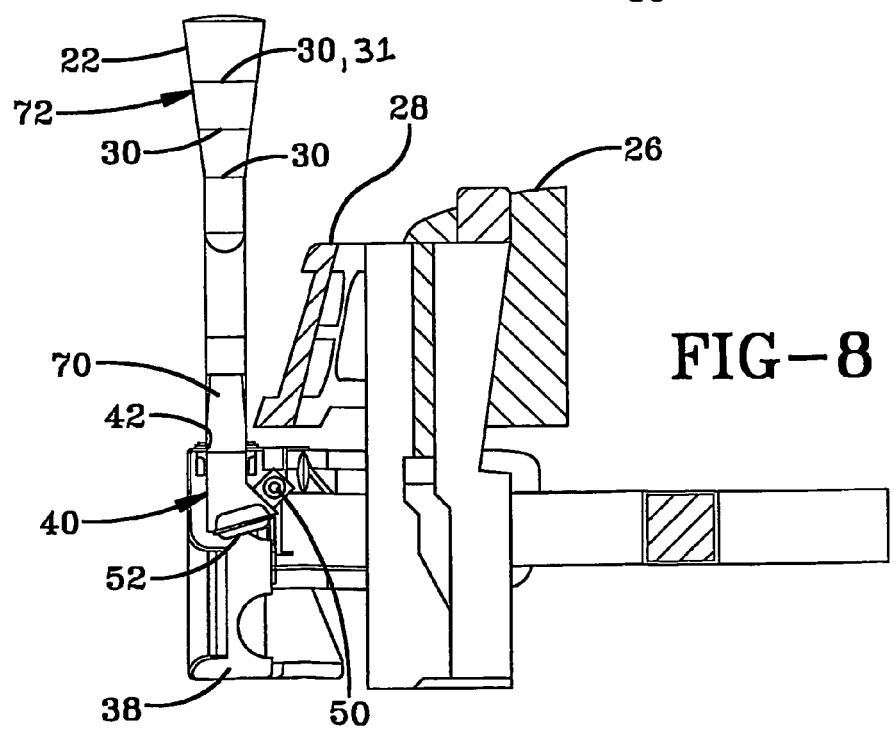

VEHICLE FRONTAL AIRBAG SYSTEM

The present invention claims priority to U.S. Provisional Application No. 60/341,984, filed Dec. 19, 2001.

BACKGROUND OF THE INVENTION

This invention relates generally to motor vehicle safety devices and in particular to inflatable airbags.

For many years the automotive industry has tried various products and methods to reduce injury to passengers and vehicles in collisions. Such products and methods have included energy absorbing bumpers, seat belts and inflatable airbags. Typically, inflatable airbags have been located in the steering column and dashboard. More recently, side impact airbags have been located in the frame surrounding the door or on the seat belt itself. The aforementioned interior-disposed airbags are directed primarily to preventing injury to the occupants of the vehicle in a collision, but do nothing to mitigate injury to the occupants of other vehicles involved in the collision, or to pedestrians who are struck by the vehicle.

External airbags have been proposed that deploy between the front bumper of the impacting vehicle and the vehicle being struck in order to reduce the severity of the impact and thereby reduce the severity of the vehicle damage and occupant injury. For example, U.S. Pat. No. 5,725,265 to Baber discloses an airbag concealed inside the rear bumper of a truck that is inflated and extends rearwardly from the bumper to reduce the effects of the impact. The bumper has a breakaway panel on the outer surface of the bumper that is removed by the inflation of the airbag. U.S. Pat. No. 6,126,214 to Kim discloses an air inflatable bumper having a bladder that inflates in response to an impact and extends outwardly from the bumper frame. U.S. Pat. No. 6,056,336 to Balgobin discloses a bumper airbag having an internal shock absorber. The airbag is deployed in a generally spherical shape forward of the bumper. U.S. Pat. No. 6,450,556 to Jacobs teaches an airbag mounted to the rear of a truck that deploys in response to the bending of the underride guard mounted at the rear or side of the truck. U.S. Pat. No. 5,732,785 to Ran, et al. discloses a proactive vehicle safety system consisting of plural airbags deployable around the perimeter of a vehicle that deploy in response to an impending impact.

The increased popularity of sport utility vehicles (SUVs), passenger trucks and other motor vehicles that stand higher than a standard automobile, has created new problems in the field of vehicle collision safety. Specifically, when one of these higher than standard vehicles broadsides a standard automobile, because of the difference in height between the two vehicles, the bumper of the higher vehicle will contact the standard automobile above the reinforced area of the door. In such cases it is possible for the upper body and head of the occupant of the struck vehicle to impact the grille or hood of the higher vehicle. Similarly, when a high profile vehicle strikes a pedestrian, in many cases the impact of the pedestrian's head against the grille and hood area causes more severe injuries than the initial impact between the bumper and the lower extremities of the pedestrian.

U.S. Pat. No. 6,474,679 to Miyasaka, et al. discloses an airbag system that deploys a pair of airbags from beneath the cowl area of a standard automobile to cover the A-pillars of the vehicle in response to a collision. The airbags prevent a pedestrian that has been struck by a vehicle from sliding up the hood and being injured by impacting the vehicle A-pillar. Although Miyasaka recognizes the importance of deploying external airbags to mitigate injuries to struck pedestrians, the airbag system disclosed by Miyasaka is suitable only for automobiles with sharply sloped hoods. High profile vehicles and vehicles with more rectangular outlines such as SUVs would not benefit significantly from airbags deployed over the A-pillars because a pedestrian struck by such a vehicle is generally injured by impact with the grille and leading edge of the hood not by impact with the vehicle A-pillars. Accordingly, what is needed is an airbag that deploys in the region above the bumper and forward of the grille to mitigate injuries to persons struck by such vehicles.

SUMMARY OF THE INVENTION

The present invention comprises an external airbag system for mounting on a vehicle such as an SUV that deploys into the region above the bumper to prevent or mitigate injuries that would have otherwise been caused by a person striking the grille or hood area of the vehicle. According to one embodiment of the invention, the airbag is stored in a housing mounted within the front bumper of the vehicle. The airbag is deployed upwardly through an opening in the upper surface of the bumper into the region between the upper surface of the bumper and the front surface of the grille and hood of the vehicle. In one embodiment of the invention, the airbag is generally T-shaped extending upward and outward from the housing to cover substantially the entire grille and leading edge of the hood. The airbag includes a plurality of internal tethers extending internally between the front wall and the back wall at regular intervals to cause the front and rear surface of the airbag to be tufted. The internal tethers reduce the volume of the airbag for a given frontal area thereby decreasing the inflation time required, without resort to fabricating the airbag from multiple independent chambers. Selected of the internal tethers may be designed to break as the airbag reaches close to its full inflation pressure to allow a portion of the airbag to bulge outwardly after the airbag is fully deployed. The remaining tethers are designed to break as the pressure increases when the airbag is collapsed in a collision. Optionally, an airbag constructed in accordance with the present invention includes a plurality of external tethers attached to the rear surface of the airbag which, as the airbag inflates, are tensioned to cause the airbag to bow rearwardly to cover fully the high crown area of the leading edge of the hood.

BRIEF DESCRIPTION OF THE DRAWINGS

The drawing figures are intended to illustrate the general manner of construction and are not necessarily to scale. In the detailed description and in the drawing figures, specific illustrative examples are shown and herein described in detail. It should be understood, however, that the drawing figures and the detailed description are not intended to limit the invention to the particular form disclosed, but are merely illustrative and intended to teach one of ordinary skill how to make and/or use the invention claimed herein and for setting forth the best mode of carrying out the invention.

FIG. 7 is a front prospective view of another embodiment of the invention;

FIG. 8 is a sectional side view of the inflated airbag of FIG. 7;

DETAILED DESCRIPTION OF THE INVENTION

Figure 1:
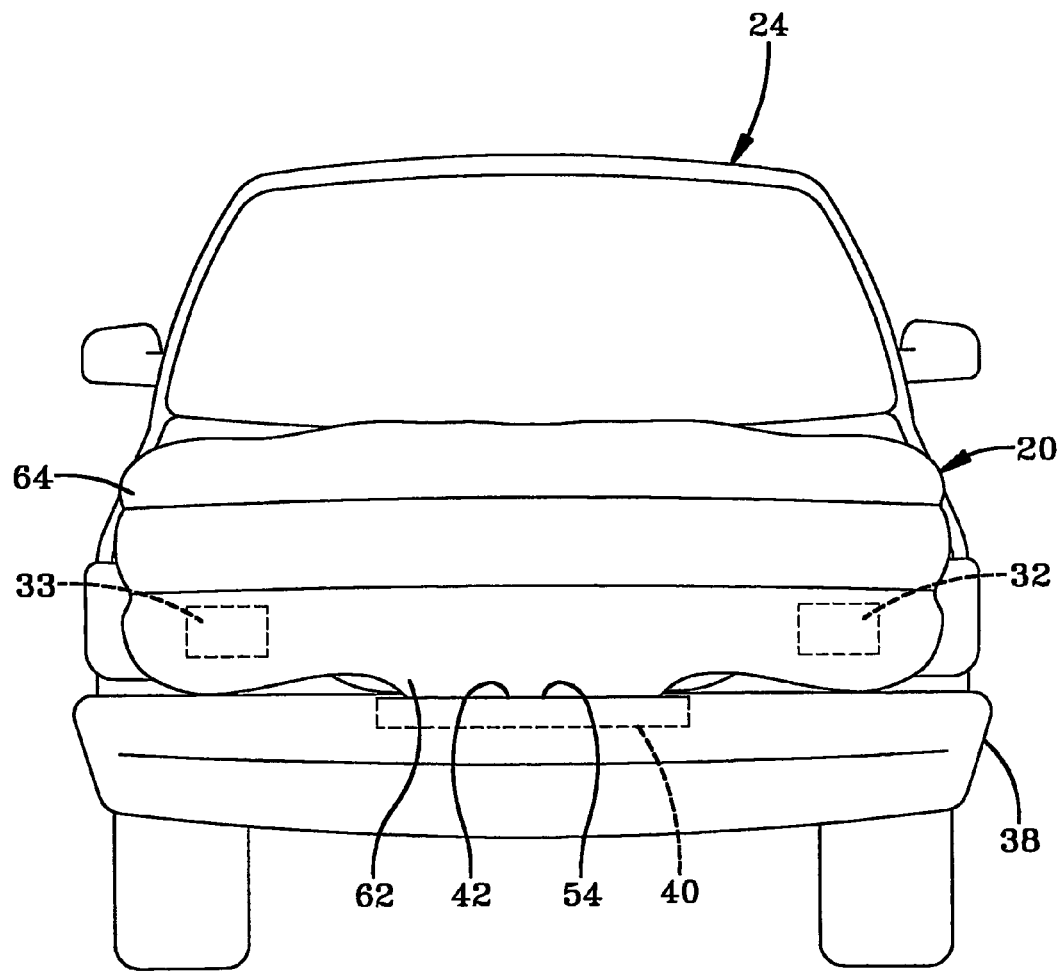
FIG. 1 is a front view of one embodiment of a frontal airbag.

The herein frontal airbags of the various embodiments have a dual purpose.

(1) The first purpose is that of reducing injury of an occupant caused by vehicle bumper height incompatibility. This is found when a truck-type vehicle, such as a SUV, crashes into the side of an automobile. In a crash wherein the struck vehicle is struck broadside by the striking vehicle, there is a tendency for the head of the occupant of the struck vehicle to hit the hood or some part of the front of the striking vehicle causing injury to the head.

(2) The second purpose is to reduce injury to pedestrians who are hit by the striking vehicle. The frontal airbag protects the pedestrian from potentially severe injury due to striking hard surfaces including the grille 28 and the front of the hood 26 of the motor vehicle 24.

There are at least four unique features of the embodiments of a frontal airbag constructed in accordance with the teachings of the present invention.

(a) The first is that the airbag deploys vertically against gravity.

(b) The second is that the airbag has internal tethers 30 interconnecting the front surface of the airbag to the rear surface of the airbag at regular intervals to create a tufted surface. The tufting reduces the total volume of the airbag for a given surface area, enabling the airbag to deploy more rapidly, without resort to incorporation of multiple chambers within the airbag.

(c) The third is that the airbag has frangible internal tethers 31 located in the central region that are designed to break during inflation allowing the airbag to expand in its center portion once the airbag is fully deployed and reaching its full inflation pressure.

(d) The remaining internal tethers 30 are also designed to break at a higher pressure than the frangible internal tethers 31 such that during a collision as the pressure within the airbag exceeds the maximum inflation pressure, the internal tethers 30 break expanding the volume to lower the pressure in the airbag down to the required level, thus managing the energy in a vehicle crash.

Referring to FIG. 1, there is illustrated a front view of a motor vehicle 24 showing one embodiment 20 of a vehicle frontal airbag system. Plural crash sensors 32, 33 are mounted on the motor vehicle and adapted to sense the presence of an object about to collide with the motor vehicle. The sensors 32, 33 are electrically connected to an electronic control unit 34, "ECU", as are pluralities of vehicle sensors 36 responsive to vehicle engine operating parameters. The electronic control unit 34, not shown, is mounted to the firewall or inside of the passenger compartment of the motor vehicle 24, and responds to the crash sensors 32, 33 and the vehicle sensors 36 for determining that a collision is about to happen and deploying the frontal airbag 20.

A bumper member 38 is mounted on the motor vehicle 24 with the inside surface 58 of the bumper 38 facing the front of the motor vehicle 24 and the outside surface of the bumper facing away from the front of the motor vehicle in the direction the vehicle is generally traveling forward.

Figure 5:
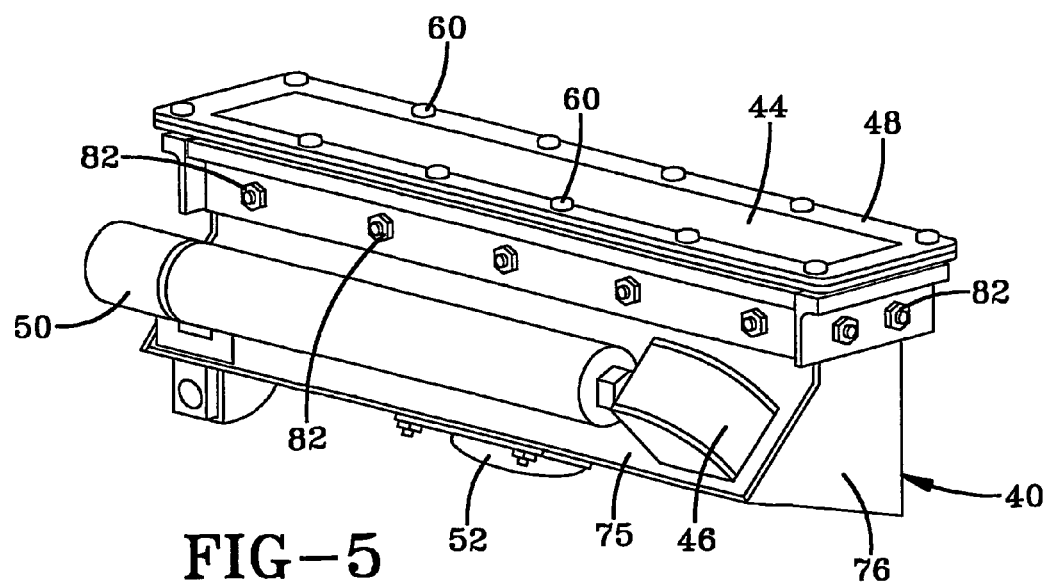
FIG. 5 is a perspective view of the frontal airbag module.
Figure 6:
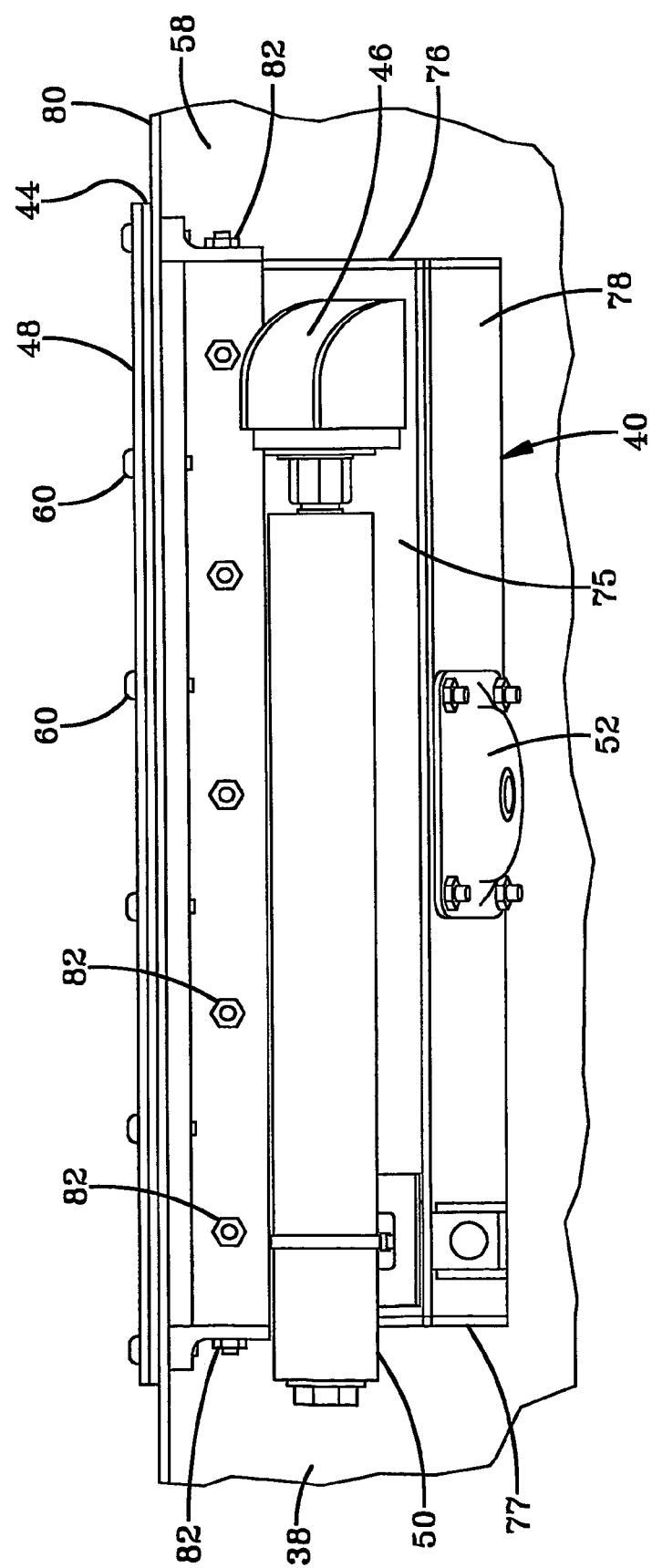
FIG. 6 is a partial rearview of the module mounted on the bumper.

A module member 40, FIGS. 5–6, is mounted behind and adjacent to the inside surface of the bumper member 38. The module member 40 has an aperture or opening 42 in one, typically the top, surface so that when it is mounted the opening 42 is aligned in a direction that is facing upward relative to the normal position of the motor vehicle 24.

Figure 4:
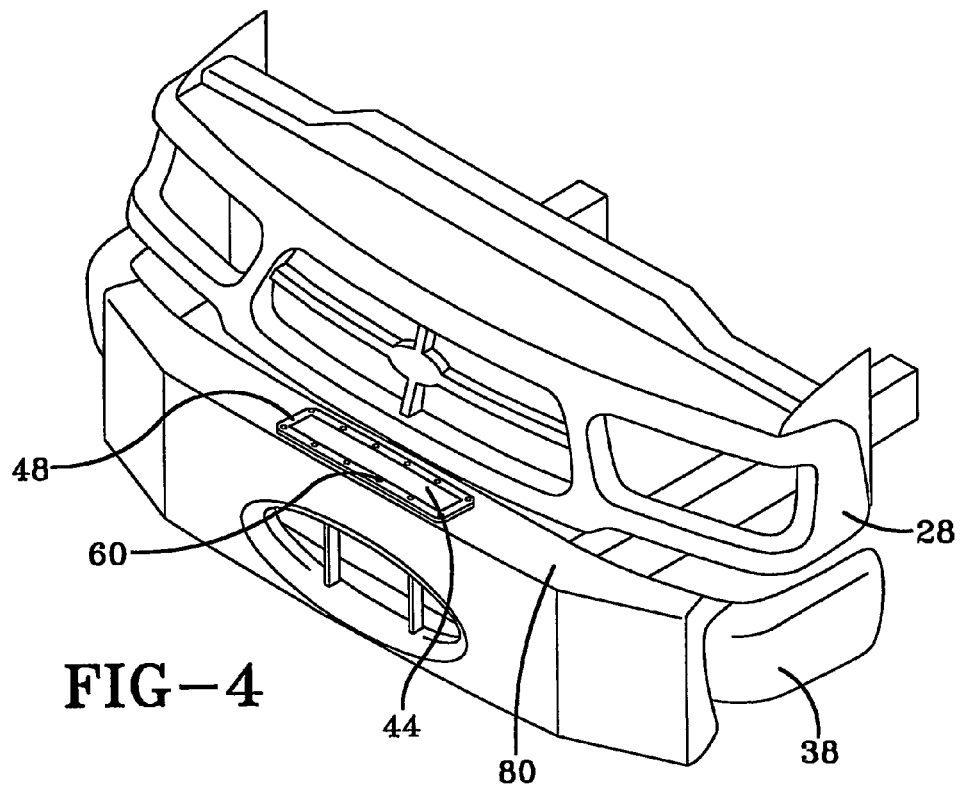
FIG. 4 is a perspective view of the front end of a motor vehicle illustrating the frangible airbag cover.

A frangible cover 44, FIG. 4, encloses the aperture or opening 42 and is mounted on the module 40. An inflation fluid connector 46 is mounted on the module 40 on the side closest to the grille 28. The frangible cover 46 is designed to fit tight to the bumper 38 and the module 40 has a bracket or cover ring 48 surrounding the frangible cover 44 to hold the module 40 tight to the bumper 38.

The inflation fluid connector 46 is adapted to receive inflation fluid from an inflator 50, 52 that may be mounted on the module 40 or located on the vehicle and connected to the connector 46 by a high-pressure hose. The inflator 50, 52 is also electrically connected to the ECU 34. Illustrated in FIGS. 5 and 6 are both a cylindrical inflator 50 and a pancake inflator 52. The selection of the type of inflator is up to the airbag designer. Either or both may be used.

Located in the module member 40 is an inflatable frontal airbag 20 that is securely connected to the module member 40 and adapted to receive inflation fluid from the inflator 50, 52 through the inflation fluid connector 46. In one embodiment, FIGS. 1–3, the frontal airbag 20 may be fabricated from a pair of sheets of fabric, or a single sheet folded over, that have a pair of opposite sides held together by stitching substantially around the perimeter leaving an open throat 54 at the bottom. The frontal airbag 20 is accordion folded and placed within the module member 40 such that the throat of the airbag is operatively connected to receive the inflation fluid.

Figure 10:
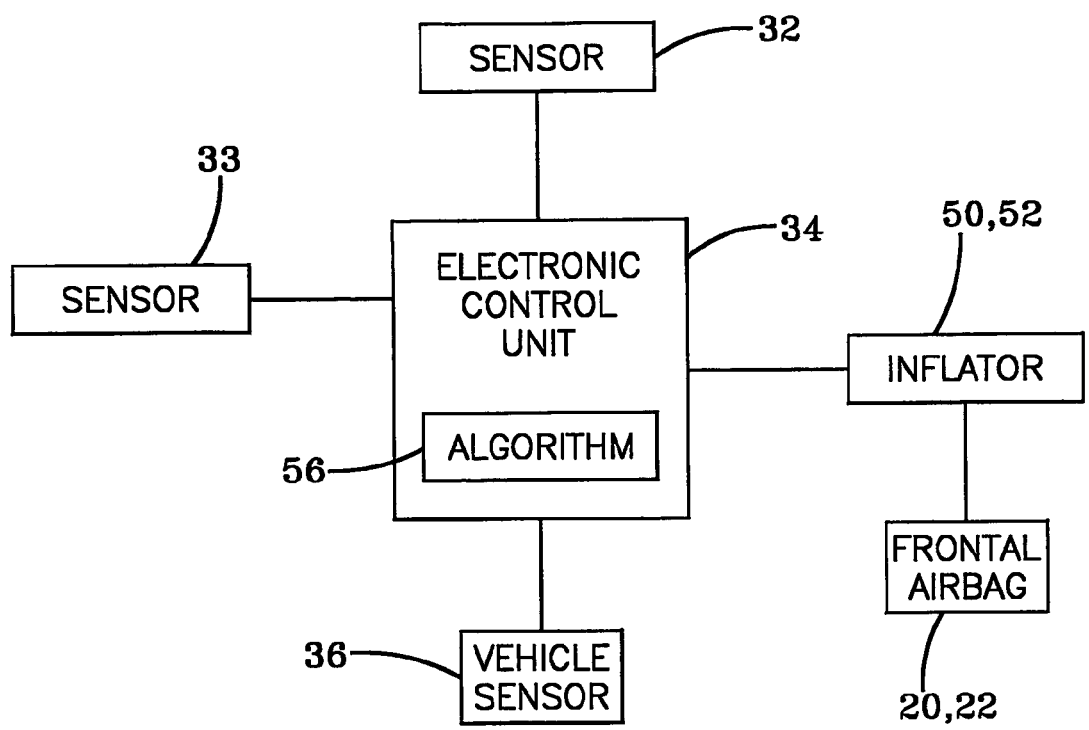
FIG. 10 is a schematic of a control system for the invention.

The frangible cover 44 functions to restrain the uninflated folded airbag and when the airbag is inflated, the frangible cover 44 is broken allowing the airbag 20 to be deployed. The electronic control unit 34, FIG. 10, responds to at least one sensor 32 or 33 indicating a potential crash between the motor vehicle 24 and a struck vehicle and by means of an appropriate algorithm 56 causes the folded frontal airbag 20 to inflate and break through the frangible cover 44.

FIGS. 4 and 6 illustrate a bumper 38 having an opening intermediate its ends. The module 40 is mounted against the inside 58 of the bumper 38 and the opening 42 in the module 40 is aligned with the opening in the bumper 38. The frangible cover 44 overlies the opening in the bumper, hence the opening 42 in the module 40. The frangible cover 44 is secured by means of fasteners 60 such as bolts and nuts.

Typically at least two sensors 32, 33 are mounted in a spaced apart relationship on the front of the motor vehicle 24 to sense the approach of another vehicle or object. The algorithm 56 in the electronic control unit 34 is designed to determine the characteristic of the approaching vehicle or object in a manner well known in the art. The algorithm 56 will, from the information generated by the sensors 32, 33 determine when to inflate the airbag 20.

Figure 2:
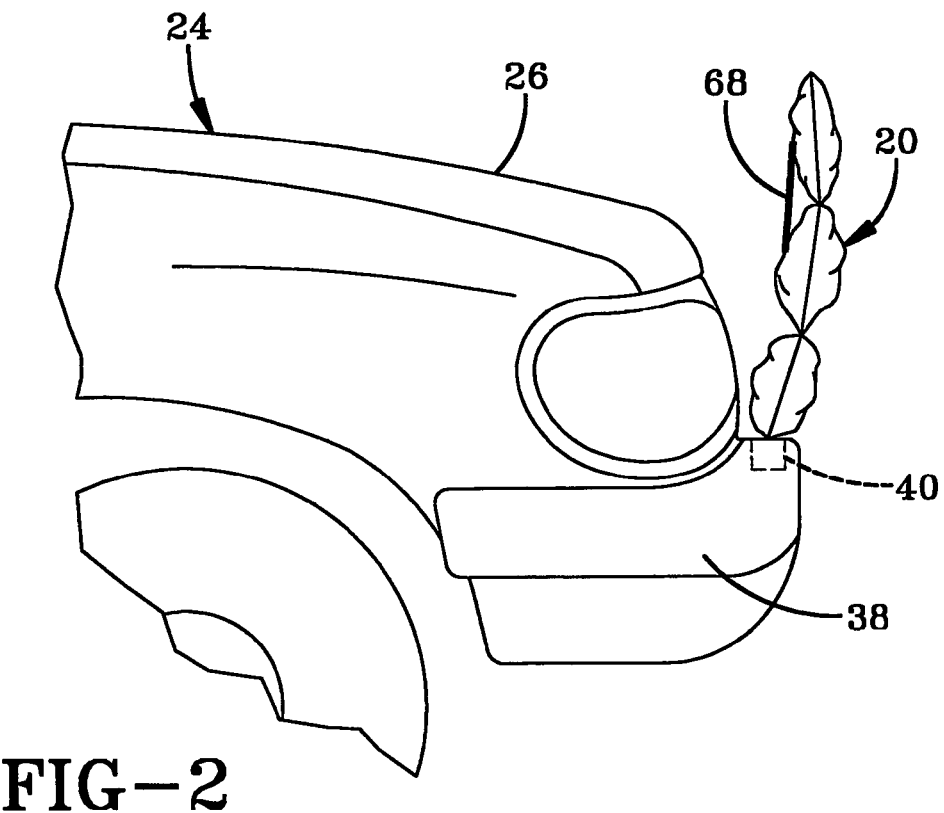
FIG. 2 is a side view of FIG. 1 illustrating the airbag being inflated showing the external tethers before the airbag is fully inflated.
Figure 3:
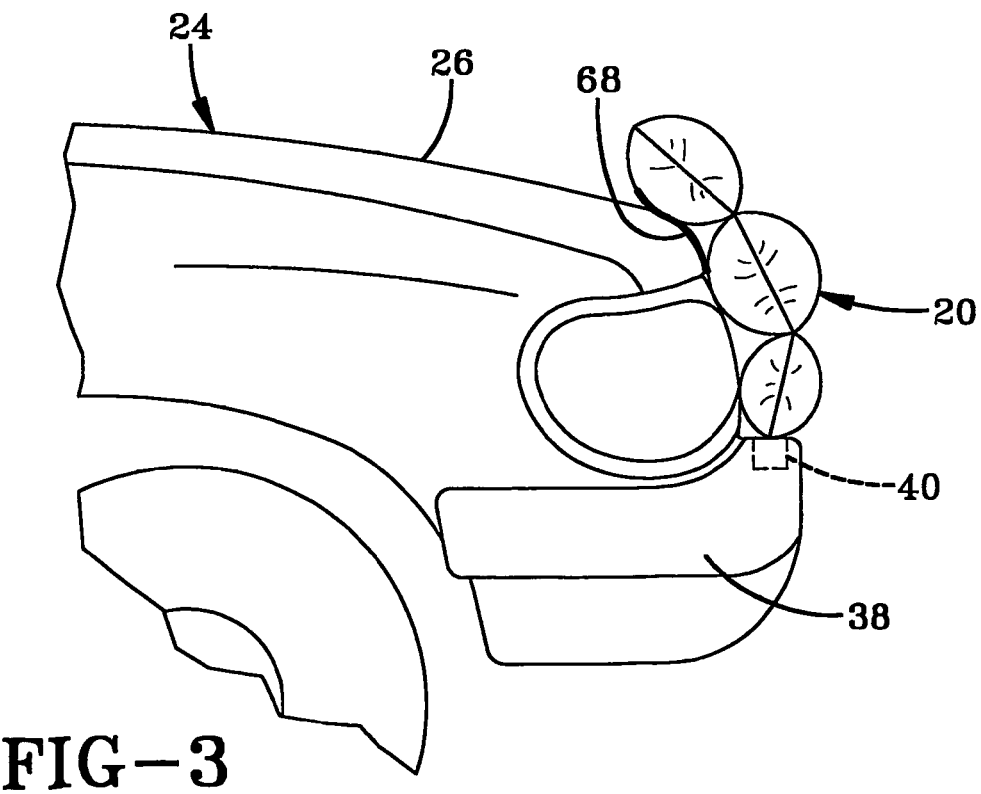
FIG. 3 illustrates the external tethers of FIG. 2 bending the airbag over the front of the hood.

As illustrated in FIG. 1, the frontal airbag 20 when inflated is generally T-shaped with the vertical member 62 of the T-shaped airbag extending from the throat 54 and the aperture 42 in the module 40. The cross-arm member 64 of the T-shape extends across the grille 28 of the motor vehicle (although the illustrative embodiment shows a conventional grille, as used herein grille means and refers to the region of the vehicle immediately behind the bumper, whether it be a conventional grille, light array or sloped portion of the hood.) As shown in FIGS. 2–3, the cross-arm member 64 has a plurality of inflated cylindrically shaped rows 66. Optionally, FIG. 2-3, a plurality of external tethers 68 is connected between the rear surfaces of at least two of the uppermost cylindrically shape rows 66. As the rows inflate, the external tethers 68 cause the uppermost two rows to bend over the top portion of the vehicle grille 28 and cover the forward edge of the hood 26. Without the optional external tethers 68, the airbag 20 will extend vertically and the force of the object hitting the airbag 20 will cause the airbag to deflect over the edge of the hood 26.

In another embodiment, as shown in FIG. 7, the inflatable airbag 22 is T-shaped when inflated with the vertical member 70 of the T-shaped airbag 22 extending from the throat 54. The cross-arm member 72 of the T-shaped airbag 22 extends vertically in front of the grille 28 of the motor vehicle 24. There is a plurality of internal tether members 30, FIG. 8, located between the opposed inner surfaces 74 of the opposite sides of the airbag 22 tending to hold the shape of the airbag 22 until the pressure increases and the internal tethers 30 break allowing the airbag 22 to expand. The inflation pressure between 7–9 psi, in the airbag 22 maintains it in a vertical orientation from the opening in the bumper 38 holding the airbag 22 in front of the grille 28 of the motor vehicle 24.

FIG. 6 shows the module 40 mounted to the vehicle bumper 38 with a frangible cover 44 enclosing a non inflated airbag stored therein. An inflator 50 or 52 is responsive to the ECU 34 control system and operates to inflate the airbag 22 for opening the frangible cover 44 and deploying now inflated airbag across the grille 28 at the front of the vehicle 24.

Depending upon the design of the algorithm 56 which is not the subject of this invention, the sensors 32, 33 deployed on the front of the motor vehicle 24 may be of many types such as an infrared sensor or a capacitive sensor. This is a choice of the system designer.

FIG. 5 illustrates the module 40 being a rectangular-shaped member having first 74 and second 76 elongated side plates or members. The third 76 and fourth 77 end plates or members and fifth 78 bottom plate or member complete the enclosing of the module 40 except for the open top. All of the members 74–78 are rigid members connected together to form the rigid rectangular-shaped member having an open top. In the preferred embodiment, all of the members 74–78 are steel. Connected to one of the elongated rigid side members 75 is an inflation fluid connector 46.

The frangible cover 44 is fastened to the module 40 to enclose the open top. In FIG. 6, the frangible cover 44 is spaced from the open top to allow the top bumper panel 80 to fit between a cover ring 48 and the frangible cover 44. The cover ring 48 operates to hold the rigid module 40 in position on the vehicle 24.

Extending from the side members 74–78 is a plurality of holders or fasteners 82 for securing stored folded frontal airbag 22 to the module 40. When the module 40 is secured to the motor vehicle 24, the frangible cover 44 faces upward in the direction of the grille 28 of the motor vehicle. In FIG. 7, upon inflation of the frontal airbag 22, the frangible cover 44 is burst open and the airbag 22 moves out of the module 40 and spreads up and across in front of the grille 28. In one embodiment, FIG. 1, the airbag 20 folds over the front of the hood 26 and in another embodiment, FIG. 7, the frontal airbag 22 remains vertical in front of the grille 28.

Figure 9:
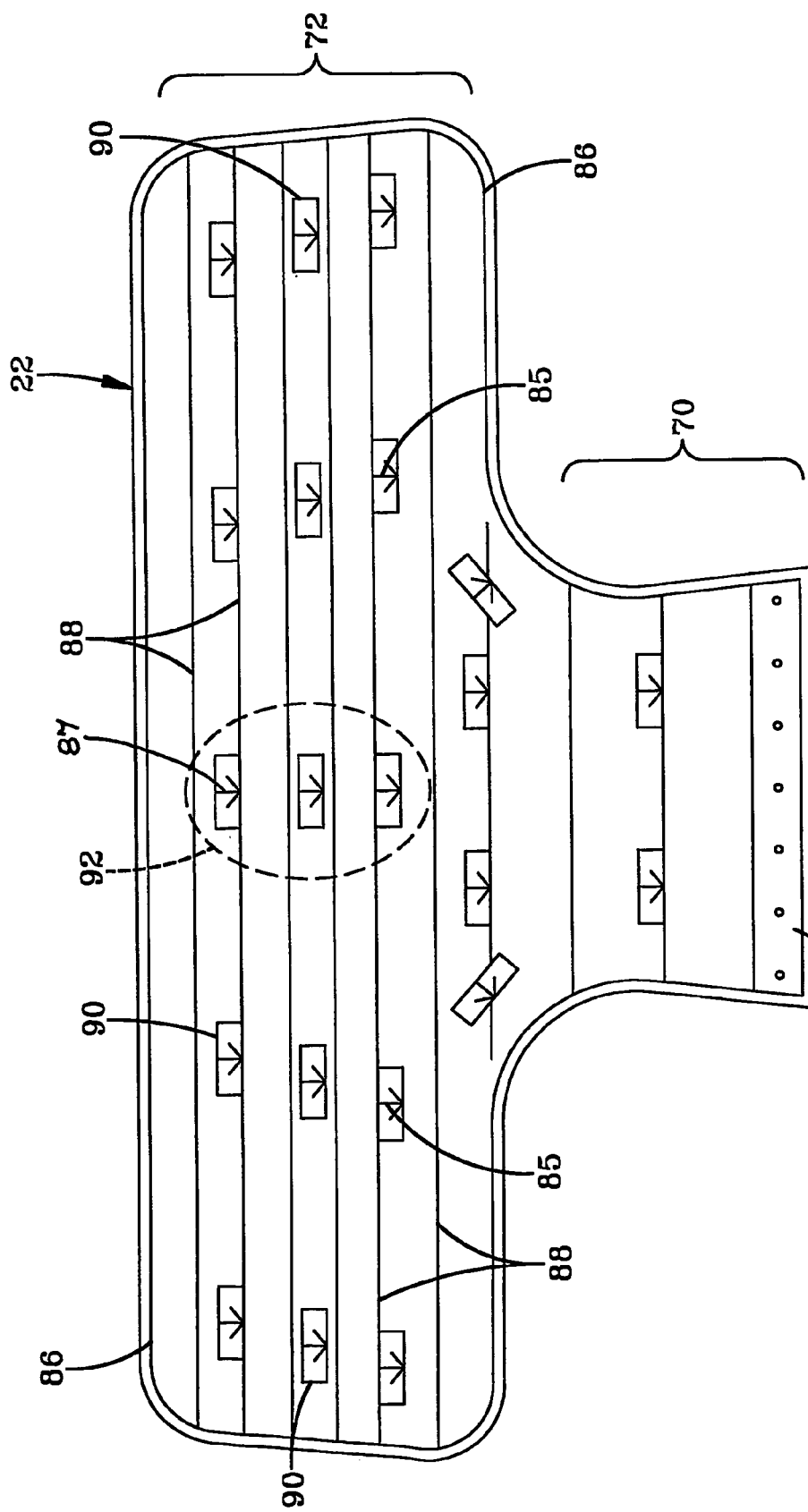
FIG. 9 is a pattern for the airbag of FIG. 7.

FIG. 9 illustrates one embodiment of the frontal airbag 22. This embodiment is typically fabricated from sheet material having a first sheet of material having at least one side being coated. The second sheet of the material has a shape that is congruent with the first sheet and also has at least one side coated. In the preferred embodiment, the coating is silicone. The shape of both sheets is in the form of a "T". The coating is for sealing the airbag 22 and being silicone or urethane to provide a smooth surface to facilitate deployment of the airbag 22. In the alternative, instead of two separate sheets, the airbag may be fabricated from a single sheet first folded in half and then the shape is formed.

A plurality of internal tethers 30, represented by open arrows 85 in FIG. 9, are each sewn at their respective ends to each of the uncoated sides. Similarly a plurality of frangible internal tethers 31 represented by arrows 87 are attached in the region represented by the dashed line 92. The internal tethers 30 and 31 form a plurality of rows, in the preferred embodiment five rows of internal tethers 30 and 31 separated by five blank rows. Each row is substantially parallel to the cross-arm of the "T".

The first and second sheets are positioned to overlie each other so that the uncoated sides are facing each other. The perimeter edges 86 of the two overlying sheets are sewn together except across the base of the vertical arm 70 of the T-shape that forms the throat 54. The rows, which are ten in the preferred embodiment, are folded together in an accordion fold extending from the top of said cross-arm toward the throat 54.

The fabric of one embodiment of the airbag is 525 denier with a silicone coating; the fabric of the internal tethers 30 and 31 are 840 denier with either a silicone coating or a urethane coating on both sides of the fabric. The stitching for the perimeter and the tethers is "Double Needle Chain Stitch "DNCS" with 138 SPECTRA thread available from Honeywell, Inc. (formerly Allied Thread) of Morristown, N.J.

Referring to FIG. 9, the first step is to secure a sheet of the fabric 64 for the piece about to be cut and then cut out the pattern for that piece. Next mark horizontal lines 88 on the each sheet of the airbag fabric 84 to represent the fold lines. These fold lines 88 are spaced a distance as determined by the airbag designer. It has been found that by pressing the lines 88 to cause a fold, folding of the airbag 22 is greatly enhanced. Then, sew a reinforcing strip 90 of 525 denier fabric at each location represented by a pattern box. This sewing is done on the uncoated side of the fabric. Next cut the internal tethers 30 and 31 from 840 denier fabric, the three frangible tethers 31 having a urethane coating. The three urethane coated frangible tethers 31 are sewn at the middle location, surrounded by an endless line 92 of the first three rows. Preferably the stitching that passes through the airbag surface is sealed with a silicone or urethane sealant.

The appropriate length internal tethers 30 should be sewn to each row at the marked locations and sewn on the uncoated side of the airbag fabric. The internal tethers 30 are attached to each sheet of the airbag, effectively securing both sides of the airbag 22 a fixed distance apart when the airbag is deployed. Then sew the perimeter edge 86 of the airbag 22 together except for the throat 54 portion at the bottom of the airbag that should remain open. Next fold the flat, uninflated airbag 22 in a telescopic fold. The folding begins at the top and proceeds along each marked horizontal line 88 until the folding reaches the fourth row. Then each side of the cross-arm 72 of the T-shaped bag is folded in toward the middle to allow the remaining portion of the airbag 22 to be telescoped up providing the complete packaged airbag. The throat 54 is located at the bottom and will be secured to the module 40 by the holders 82 around its perimeter.

In the preferred embodiment, the pressure in the airbag when fully inflated is between seven and nine pounds per square inch. The airbag 20 is completely deployed in approximately seventy milliseconds. When the airbag becomes almost fully inflated, the internal tethers 31 in the middle of the airbag 22 tend to break forming a bulge in the airbag 22 at substantially the center of the inflated airbag and lowering the internal pressure in the airbag.

By telescoping the un-inflated airbag due to the folding, the airbag 22, during inflation, will come out of the module in an orderly manner, typically with the top of the T-being the first part of the airbag that has broken through the frangible cover 44.

It is understood that the step of making the horizontal lines 88 on the airbag sheet material 84 may be done automatically by the pattern machine or in the alternative, the stitching machine can be programmed to correctly place the reinforcing strips 90 for securing the internal tethers 30 and 31.

An alternative to the above method is to have two pieces of fabric that are positioned such that one overlies the other. If the desired fabric weight is 840 denier, in this method each sheet can be 420 denier. Each piece of fabric is coated on one side and the uncoated sides face each other. The next step is to weave the two pieces of fabric together. Typically each weave pattern is two or more rows. The rows are transverse to the length of the fabric, i.e. across the width of the fabric. Each group of rows is spaced a predetermined distance from the preceding group. The predetermined distance is equal to one half the initial thickness of the partially inflated airbag as illustrated FIG. 8.

At certain groups of rows, this to be a design decision of the airbag designer, cut through one layer of the cloth creating a flap extending the width of the sheet. Note each flap is held to the double fabric by a group of rows of the weaving. By weaving the two sheets of fabric together there is substantially no leakage through the seam and the seam is substantially flush with the surface of the fabric, wherein a sewn seam will have leakage due to the needle holes and will be a raised seam.

Cut the woven sheet to the desired pattern and size. Take two cut sheets and place the flap sides together. Cut the flaps, which now extend the width of the sheets, to a desired width, having a space between the flaps, and sew the edge of the flaps from one sheet to the corresponding edge of the other sheet. At this stage, the sewn flaps hold the two outside sheets together. The space between the flaps will allow the inflation fluid to pass. When the flaps are all connected, then sew the perimeter, except for the throat area 59, of the two outside sheets together forming the desired T-shaped airbag. The stitching for the perimeter can be "Double Needle Chain Stitch "DNCS" with 138 Spectra thread. The completed T-shaped airbag is now telescopically folded and put into the module.

What you have at this time is an airbag with the outside surfaces coated, the internal seams are woven together and the perimeter seam is sewn with such a stitch and thread sized to make the airbag substantially leak proof. However, it is known that after a period of time the pressure inside the inflated airbag will cause the inflation fluid to leak off and the airbag will deflate.

Accordingly, various changes and modifications may be made to the illustrative embodiment without departing from the spirit or scope of the invention. It is intended that the scope of the invention, not be limited in any way to the illustrative embodiment shown and described, but that the invention be limited only by claims appended hereto and by the rules and principals of applicable law.

What is claimed:

1. An external airbag system for mounting on a vehicle, said vehicle having a hood and a bumper member forward of said hood facing in a crash direction, said external airbag system comprising:
    a housing for storing an airbag within said bumper member, said housing having an opening facing in an upward direction relative to said vehicle in normal operation;
    an airbag having a front wall and a rear wall and being sized and shaped to be deployed upon inflation above said bumper member for absorbing energy of an impact, said airbag being stored in an uninflated condition within said housing;
    a source of pressurized gas for inflating said airbag;
    at least one sensor for determining whether an impact is imminent or has occurred; and
    a logic circuit responsive to said sensor for providing an initiation signal to initiate said source of pressurized gas for deploying said airbag;
    wherein, in response to said initiation signal, said airbag deploys through said opening in an upward direction such that in a deployed condition said airbag has a T-shaped outline when viewed from the front of said vehicle and the majority of the volume enclosed by said airbag is above the bumper member and behind the leading edge of the bumper member.

2. The external airbag system of claim 1, wherein said airbag deploys such that substantially the entire volume enclosed by said airbag is behind the leading edge of the bumper member.

3. The external airbag system of claim 1, wherein the front surface of said airbag is tufted by means of a plurality of internal tethers.

4. The external airbag system of claim 1, wherein: said housing further comprises a frangible cover for covering said opening.

5. The external airbag system of claim 1, wherein: said vehicle further comprises a grille area disposed rearward of said bumper member, said airbag being deployed such that in an impact between said vehicle and an object in a crash direction, the majority of the volume of said airbag is compressed between said object and said grille area.

6. An external airbag system for mounting on a vehicle, said vehicle having a hood and a bumper member forward of said hood facing in a crash direction, said external airbag system comprising:
    a housing for storing an airbag within said bumper member, said housing having an opening facing in an upward direction relative to said vehicle in normal operation;
    said airbag having a front wall and a rear wall, said airbag further comprising a first plurality of internal tethers and a second plurality of internal tethers attached between said front wall and said rear wall, said first plurality of tethers rupturing at a first inflation pressure, said second plurality of internal tethers rupturing at a second inflation pressure greater than said first inflation pressure;
    a source of pressurized gas for inflating said airbag;
    at least one sensor for determining whether an impact is imminent or has occurred; and a logic circuit responsive to said sensor for providing an initiation signal to initiate said source of pressurized gas for deploying said airbag;

wherein, in response to said initiation signal, said airbag deploys through said opening in an upward direction such that in a deployed condition the majority of the volume enclosed by said airbag is above the bumper member.

7. The external airbag system of claim 6, wherein:

said first inflation pressure is less than the fully-deployed inflation pressure of said airbag and said second inflation pressure is treater than the fully-deployed inflation pressure, whereby said first plurality of internal tethers assist in deployment of said airbag by maintaining said airbag in a predetermined shape during inflation and said second plurality of internal tethers rupture during impact to dissipate energy.

8. The external airbag system of claim 6, wherein:

said rear wall of said airbag includes at least two attachment points, one located above the other along said rear wall, said airbag further comprising at least one external tether attached to said two attachment points, the length of said at least one external tether being less than the length of said rear wall between said two attachment points such that as said airbag assumes a fully deployed condition, said at least one external tether induces a rearward bow in said airbag.

9. An external airbag system for a vehicle having a front end and a rear end, said airbag system comprising:

a housing for storing an airbag on said vehicle;

an airbag having a front wall and a rear wall and being sized and shaped to be deployed upon inflation above said bumper member for absorbing energy of an impact, said airbag being stored in an uninflated condition within said housing, said airbag further comprising a first plurality of internal tethers and a second plurality of tethers attached between said front wall and said rear wall, said first plurality of internal tethers rupturing at a first inflation pressure, said second plurality of internal tethers rupturing at a second inflation pressure greater than said first inflation pressure, said airbag in a deployed condition having a T-shaped outline when viewed from the front of said vehicle;

a source of pressurized gas for inflating said airbag;

at least one sensor for determining whether an impact is imminent or has occurred; and a logic circuit responsive to said sensor for providing an initiation signal to initiate said source of pressurized gas for deploying said airbag.

10. The external airbag system of claim 9, wherein:

the front surface of said airbag is tufted inward at a plurality of locations along said front surface.

11. The external airbag system of claim 9, wherein:

said first inflation pressure is less than the fully-deployed inflation pressure of said airbag and said second inflation pressure is greater than the fully-deployed inflation pressure, whereby said first plurality of internal tethers assist in deployment of said airbag by maintaining said airbag in a predetermined shape during inflation and said second plurality of internal tethers rupture during impact to dissipate energy.

12. The external airbag system of claim 9, wherein:

said airbag comprises at least two attachment points, one located above the other along said rear wall, said airbag further comprising at least one external tether attached to said two attachment points, the length of said at least one external tether being less than the length of said rear wall between said two attachment points such that as said airbag assumes a fully deployed condition, said at least one external tether induces a rearward bow in said airbag.

* * * * *